(12) United States Patent
Yoon et al.

(10) Patent No.: US 11,329,517 B2
(45) Date of Patent: May 10, 2022

(54) METAMATERIAL-INSPIRED DUAL-FUNCTION LOOP ANTENNA

(71) Applicant: University of Florida Research Foundation, Inc., Gainesville, FL (US)

(72) Inventors: Yong Kyu Yoon, Gainesville, FL (US); Woosol Lee, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 0 days.

(21) Appl. No.: 17/215,798

(22) Filed: Mar. 29, 2021

(65) Prior Publication Data

US 2021/0320531 A1 Oct. 14, 2021

Related U.S. Application Data

(60) Provisional application No. 63/009,405, filed on Apr. 13, 2020.

(51) Int. Cl.
*H01Q 7/00* (2006.01)
*H02J 50/27* (2016.01)
(Continued)

(52) U.S. Cl.
CPC ............. *H02J 50/27* (2016.02); *H01Q 1/248* (2013.01); *H01Q 5/50* (2015.01); *H01Q 7/00* (2013.01);
(Continued)

(58) Field of Classification Search
CPC .......... H02J 50/27; H02J 50/23; H01Q 1/248; H01Q 5/50; H01Q 7/00; H01Q 15/0086; H01Q 15/02
See application file for complete search history.

(56) References Cited

U.S. PATENT DOCUMENTS

2021/0306284 A1\* 9/2021 Jackson ................ G06F 9/5027

FOREIGN PATENT DOCUMENTS

KR 20140030514 A \* 3/2014 ............ H02J 50/005

OTHER PUBLICATIONS

X. Cheng et al. "A Dual-Function Helix Antenna With Wireless Communication and Power Transmission Capabilities for Capsule Endoscope". PowerMEMS. pp. 516-519. Dec. 2-5, 2012.
(Continued)

*Primary Examiner* — Daniel Cavallari
(74) *Attorney, Agent, or Firm* — Thomas | Horstemeyer, LLP

(57) ABSTRACT

The present disclosure describes various embodiments of systems, apparatuses, and methods of fabricating a metamaterial-inspired dual-function loop antenna. One such antenna device comprises a loop antenna and a metamaterial slab integrated on top of the loop antenna. Accordingly, the metamaterial slab metamaterial has a negative refractive index value at a first frequency and a near zero refractive index at a second frequency, wherein the first frequency is less than the second frequency, each unit cell of the metamaterial slab is coupled to a capacitor in parallel, the first frequency is attributed to a capacitance value of the capacitor, and the second frequency is attributed to a dimension of the unit cell. As such, the antenna device is configured to receive wireless power transfer signals over the first frequency and wireless communication signals over the second frequency. Other apparatuses, systems, and methods are also presented.

20 Claims, 14 Drawing Sheets

(51) Int. Cl.
*H02J 50/23* (2016.01)
*H01Q 15/02* (2006.01)
*H01Q 1/24* (2006.01)
*H01Q 5/50* (2015.01)
*H01Q 15/00* (2006.01)

(52) U.S. Cl.
CPC ......... *H01Q 15/0086* (2013.01); *H01Q 15/02* (2013.01); *H02J 50/23* (2016.02)

(56) References Cited

OTHER PUBLICATIONS

A. L. A. K. Ranaweera et al. "Experimental investigation of compact metamaterial for high efficiency mid-range wireless power transfer applications". Journal Of Applied Physics. vol. 16., pp. 043914-1-043914-8. 2014.

Y. Zhang et al. "Experiments on adjustable magnetic metamaterials applied in megahertz wireless power transmission". AIP Advances. vol. 5, pp. 017142-1-017142-9. 2015.

B. Wang et al. "Experiements on wireless power transfer with metamaterials". Applied Physics Letters, vol. 98, pp. 254101-1-254101-3. 2011.

T. Shaw et al. "Wireless Power Transfer System Based on Magnetic Dipole Coupling with High Permittivity Metamaterials". IEEE Antennas and Wireless Propagation Letters. vol. 18, No. 9, pp. 1823-1827.

Y. Cho et al. "Thin Hybrid Metamaterial Slab With Negative and Zero Permeability for High Efficiency and Low Electromagnetic Field in Wireless Power Transfer Systems", IEEE Transactions on Electromagnetic Compatibility. vol. 60, No. 4, pp. 1001-1009. Aug. 2018.

W. J. Padilla et al. "Negative refractive index metamaterials". Materialstoday. vol. 9, Nos. 7-8, pp. 29-35. Jul.-Aug. 2006.

Y. J. Lee et al. "Design of a High-Directivity Electromagnetic Band Gap (EBG) Resonator Antenna Using a Frequency-Selective Surface (FSS) Superstrate". Microwave and Optical Technology Letters. vol. 43, No. 6, pp. 462-467. Dec. 20, 2004.

Z. B. Weng et al. "A Directive Patch Antenna With Metamaterial Structure". Microwave and Optical Technology Letters. vol. 49, No. 2, pp. 456-459. Feb. 2007.

A. K. Singh. "High-Gain and High-Aperture-Efficiency Cavity Resonator Antenna Using Metamaterial Superstrate". IEEE Antennas and Wireless Propagation Letters. vol. 16, pp.

C. Kim et al. "A Surface Micromachined High Directivity GPS Patch Antenna with a Four-leaf Clover Shape Metamaterial Slab". IEEE Xplore. pp. 942-947.

D. R. Smith et al. "Determination of effective permittivity and permeability of metamaterials from reflection and transmission coefficients". Physical Review B. vol. 65, pp. 195104-1-195104-5. 2002.

D. R. Smith et al. "Electromagnetic parameter retrieval from inhomogeneous metamaterials". Physical Review E. vol. 71, pp. 036617-1-036617-11. 2005.

X. Chen et al. "Robust method to retrieve the constitutive effective parameters of metamaterials". Physical Review E. vol. 70, pp. 016608-1-016608-7. 2004.

Z. Szabó et al. "A Unique Extraction of Metamaterial Parameters Based on Kramers-Kronig Relationship". IEEE Transactions on Microwave Theory and Techniques. vol. 58, No. 10, pp. 2646-2653. Oct. 2010.

J. B. Pendry. "Negative Refraction Makes a Perfect Lens". Physical Review Letters. vol. 85, No. 18, pp. 3966-3969. Oct. 30, 2000.

E. Saturnino Gámez Rodriguez. "Compact Low-Frequency Metmaterial Design for Wireless Power Transfer Efficiency Enhancement". IEEE Transactions on Microwave Theory and Techniques. vol. 64, No. 5, pp. 1644-1654. May 2016.

A. Rajagopalan, "Improving Power Transfer Efficiency of a Short-Range Telemetry System Using Compact Metamaterials". IEEE Transactions on Microwave Theory and Techniques. vol. 62, No. 4, pp. 947-955. Apr. 2014.

V. T. Nguyen. "Magnetic Resonance Wireless Power Transfer using Three-Coil System with Single Planar Receiver for Laptop Applications". IEEE Transactions on Consumer Electronics. vol. 61, No. 2, pp. 160-166. May 2015.

* cited by examiner

TABLE I. COMPARISON OF THE PROPOSED WORK WITH EARLIER REPORTED METAMATERIAL (MTM) BASED WPT SYSTEMS

| Ref. | Operating frequency (MHz) | Diameter of Tx/Rx (mm) | Negative refraction index | Normalized transfer distance | Efficiency with MTM (%) |
|---|---|---|---|---|---|
| [1] | 27 | 400 | $\mu_r = -1$ | 2.5 | 47 |
| [2] | 7.43 | 150 | $\mu_r = 0$ $\mu_r = -1$ | 2.67 | 18.6 |
| [3] | 5.57 | 40 | $\mu_r = -1$ | 2 | 35 |
| [4] | 26.65 | Tx=50 Rx=36 | $\mu_r = -1$ | 2 | 18.23 |
| [5] | 6.78 | Tx=600 Rx=250 | Negative $\mu_r$ | 2 | 13 |
| This work | 6.78 | Tx=150 Rx=25.8 | $\mu_r = -1.15$ | 2 | 21.48 |

References:

[1] B. Wang, K. H. Teo, T. Nishino, W. Yerazunis, J. Barnwell, and J. Zhang, "Experiments on Wireless Power Transfer with Metamaterials," *Appl. Phys. Lett.*, Vol. 98, No. 25, 2011, Art. No. 254101.

[2] Cho, Y., et al., "Thin Hybrid Metamaterial Slab with Negative and Zero Permeability for High Efficiency and Low Electromagnetic Field in Wireless Power Transfer Systems," IEEE Trans. Electromagn. Compat., Vol. 60, No. 4 (2018)

[3] E. S. G. Rodríguez, A. K. RamRakhyani, D. Schurig, and G. Lazzi, "Compact Low-Frequency Metamaterial Design for Wireless Power Transfer Efficiency Enhancement," *IEEE Trans. Microw. Theory Techn.*, Vol. 64, No. 5, pp. 1644–1654 (May 2016)

[4] A. Rajagopalan, A. K. RamRakhyani, D. Schurig, and G. Lazzi, "Improving Power Transfer Efficiency of A Short-Range Telemetry System using Compact Metamaterials," *IEEE Trans. Microw. Theory Techn.*, Vol. 62, No. 4, pp. 947–955 (Apr. 2014)

[5] V. T. Nguyen, S. H. Kang, J. H. Choi, and C. W. Jung, "Magnetic Resonance Wireless Power Transfer Using Three-Coil System with Single Planar Receiver for Laptop Applications," in IEEE Transactions on Consumer Electronics, vol. 61, No. 2, pp. 160-166 (May 2015)

FIG. 5B

METAMATERIAL-INSPIRED DUAL-FUNCTION LOOP ANTENNA

CROSS-REFERENCE TO RELATED APPLICATION

This application claims priority to U.S. provisional application entitled, "Metamaterial-Inspired Dual-Function Loop Antenna," having Ser. No. 63/009,405, filed Apr. 13, 2020, which is entirely incorporated herein by reference.

BACKGROUND

The recent high demand for wireless power charging in the modern electronic systems has spurred active research and development of wireless power transfer (WPT) technologies. For the portability of a wireless communication electronic system, a small form factor for both WPT coils and wireless communication antennas is highly expected while not compromising the energy efficiency of the wireless power and signal coils/antennas. Several ways have been studied to address these design challenges. In order to reduce the size of the wireless electronic device, Cheng et al. (at X. Cheng, A. Rahimi, D. E. Senior, J. Wu and, YK Yoon, "A Dual-Function Helix Antenna with Wireless Communication and Power Transmission Capabilities for Capsule Endoscope", PowerMEMS 2012, Atlanta, Ga., USA (Dec. 2-5, 2012)) demonstrated a dual-function helix antenna concept for a capsule endoscope, where a single helix antenna worked as a low frequency WPT coil as well as an RF communication antenna. In other works, to enhance the performance of the WPT system and antenna, some researchers have employed metamaterial slabs. The reported metamaterial slabs have been placed in the middle of the transmitter (Tx) and receiver (Rx) coils to increase the transfer efficiency of the WPT system.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 5B shows a table (Table I) comparing an exemplary embodiment of a WPT system incorporated with a metamaterial-inspired dual-function loop antenna with the power transfer efficiency performances of previously reported metamaterial based WPT works.

DETAILED DESCRIPTION

The present disclosure describes various embodiments of systems, apparatuses, and methods of fabricating a metamaterial-inspired dual-function loop antenna. In various embodiments, such systems and methods operate at multiple frequency bands for both wireless power transfer (WPT) and wireless communication.

In general, metamaterials are artificially engineered materials that have uncommon electromagnetic properties, such as evanescent wave amplification and negative refraction, which enhance the transfer efficiency and gain of an antenna. In previous works, metamaterial slabs have been placed in the middle of a transmitter (Tx) and receiver (Rx) coils to increase the transfer efficiency of the WPT system. However, some metamaterial slabs are too large and thick to be integrated into commercial electronic devices. Meanwhile, metamaterials have been also utilized for the gain improvement as a form of metamaterial superstrates. In these works, metamaterial superstrates exhibiting near zero refractive index can enhance the antenna gain, taking advantage of the near zero refraction property of the metamaterial.

In accordance with the present disclosure, a metamaterial-inspired dual-function loop antenna is presented for wireless power transfer and wireless communication which operates at multiple frequency bands. For example, in one embodiment, an exemplary dual-function loop antenna operates at 6.78 MHz (AirFuel Alliance standard frequency) for wireless power transfer (WPT) and 2.4 GHz (BlueTooth, WiFe, Zigbee standard frequency) for wireless communication. In various embodiments, a metamaterial slab (e.g., with a dimension of 33.6 mm×33.6 mm) is integrated on top of the single-turn loop antenna, in which the metamaterial slab has an enhanced dual-band property for WPT and wireless communications with electromagnetic wave focusing capability. Such a dual-function loop antenna shows a size reduction of 50% compared to a device consisting of a separate WPT coil and a separate wireless communication antenna, a WPT efficiency improvement of 28.07% (a factor of 4.19 improvement) at a distance of 100 mm compared with a device without a metamaterial slab, and an antenna gain improvement of 1.89 dB compared with a device without a metamaterial slab.

In accordance with embodiments of the present disclosure, an exemplary dual-function loop antenna is composed of two parts, namely a loop antenna and a metamaterial slab, in which the metamaterial slab is integrated on top of the loop antenna. In one embodiment, the metamaterial has a negative and near zero refractive index for 6.78 MHz and 2.4 GHz which enables power transfer efficiency (PTE) and gain improvements. Such a dual-function loop antenna can serve as a 2.4 GHz loop antenna for wireless communications and a receiver coil for a 6.78 MHz WPT system.

Figure 1:
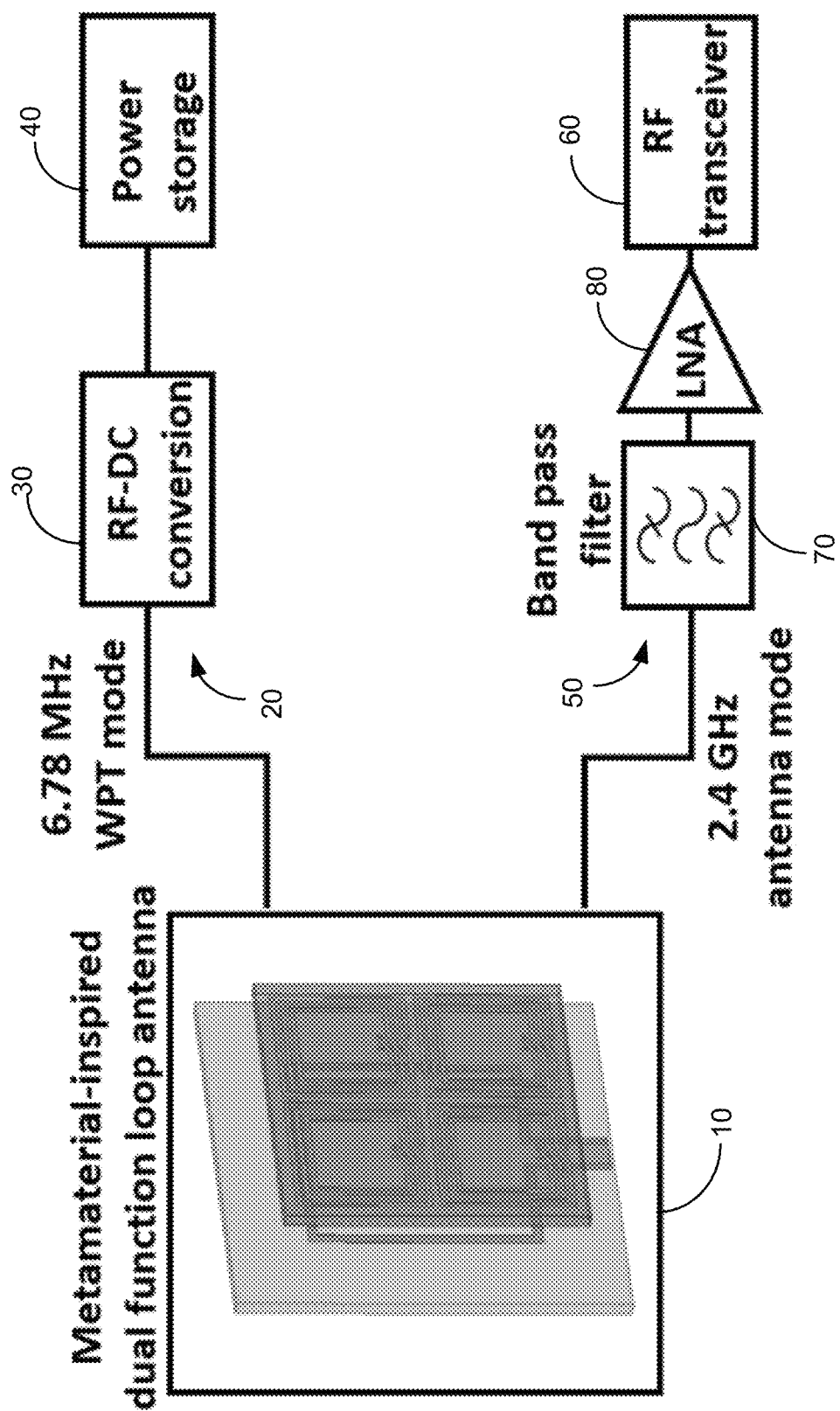
FIG. 1 shows an operation principle of an exemplary metamaterial-inspired dual-function loop antenna in accordance with various embodiments of the present disclosure.

FIG. 1 shows an exemplary operation principle of an embodiment of the metamaterial-inspired dual-function loop antenna 10. In general, an exemplary embodiment of a dual-function loop comprises a feeding line, in which a wireless power transfer (WPT) path is coupled to the feeding line and an antenna radio frequency (RF) path is coupled to the feeding line. Accordingly, the WPT path comprises an RF-DC conversion component and a power storage component connected in series, and the antenna RF path comprises a band pass filter, a low noise amplifier, and an RF transceiver connected in series. As such, the dual-function loop antenna 10 is connected to two pathways: one pathway (20) is to a 6.78 MHz WPT system which is linked to an RF-DC converter 30 and power storage device 40, and the other pathway (50) is to a 2.4 GHz RF transceiver 60 through a band pass filter (BPF) 70 and a low noise amplifier (LNA) 80. The exemplary loop antenna 10 operates at dual-band frequencies and is designed to have matched input impedance to its subsequent RF components at 6.78 MHz and 2.4 GHz. Due to the BPF of the antenna mode link 50, a 6.78 MHz signal will not pass thorough the antenna mode link 50 because the center frequency of the BPF is designed to be 2.4 GHz while the 6.78 MHz signal will pass through the WPT mode link 20. Meanwhile, if a 2.4 GHz RF signal comes in, the signal passes through the antenna mode link 50 while the signal is blocked by the WPT mode link 20.

In accordance with the present disclosure, the dual-function capability can be integrated with the metamaterial slab (that is integrated on top of the loop antenna). As discussed, the loop antenna alone can be designed to operate as a 2.4 GHz microwave antenna and an inductive coupling coil for a WPT system. In various embodiments, an exemplary metamaterial slab has a negative refractive property in the 6.78 MHz band and a near zero refractive property in the 2.4 GHz band. Thus, when the metamaterial slab is placed on the loop antenna, the slab aids the loop antenna to have better WPT and antenna performance with the negative and near zero refractive property of the metamaterial slab. However, it is challenging to design a metamaterial slab which shows a negative and near zero refractive property for a dual-band in a single metamaterial slab. In accordance with various embodiments of the present disclosure, the property of capacitive reactance in an RF circuit is utilized to tune the resonant frequency of the circuit.

Figure 2A:
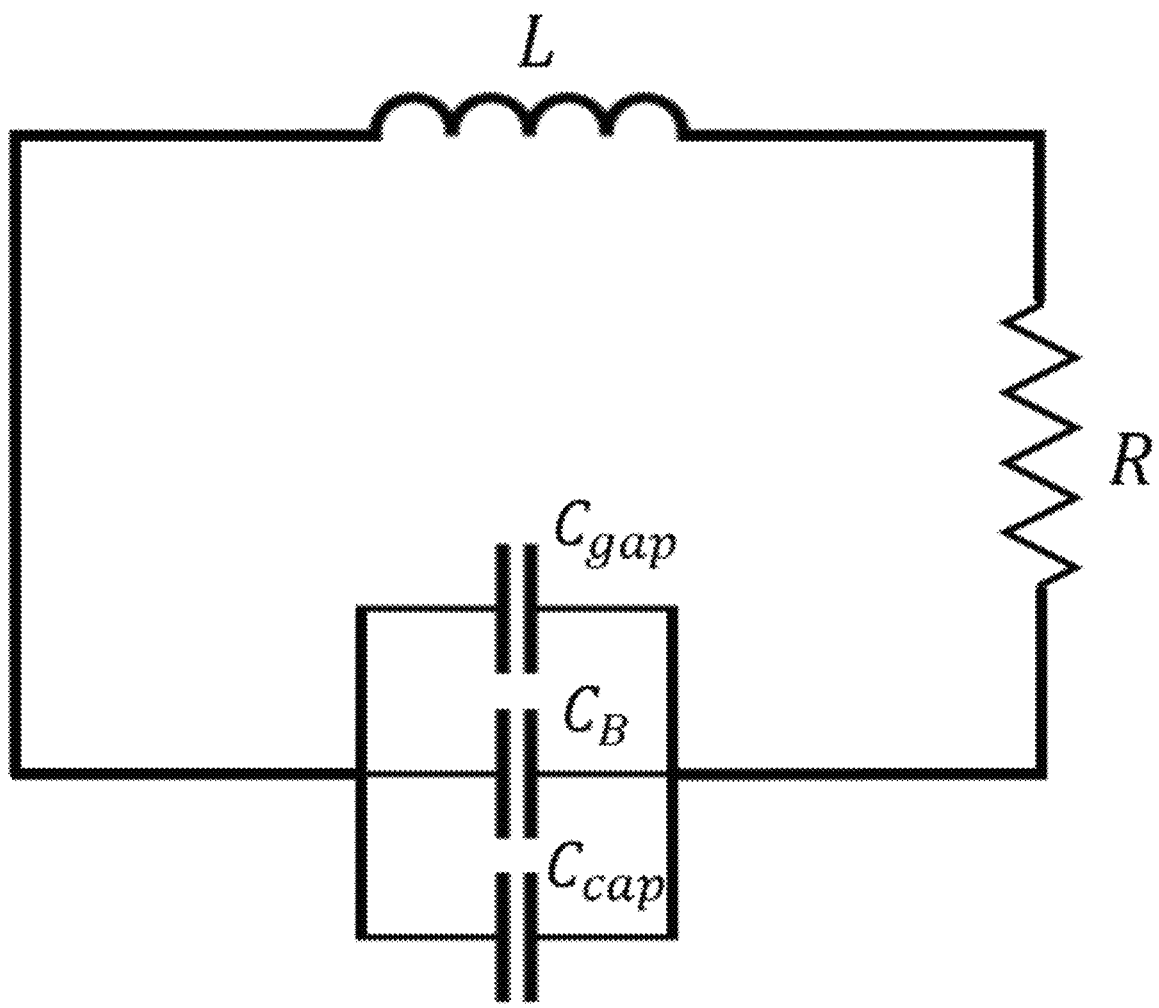
FIG. 2A shows an equivalent circuit of an exemplary metamaterial unit cell as utilized in various embodiments of the present disclosure.
Figure 2B:
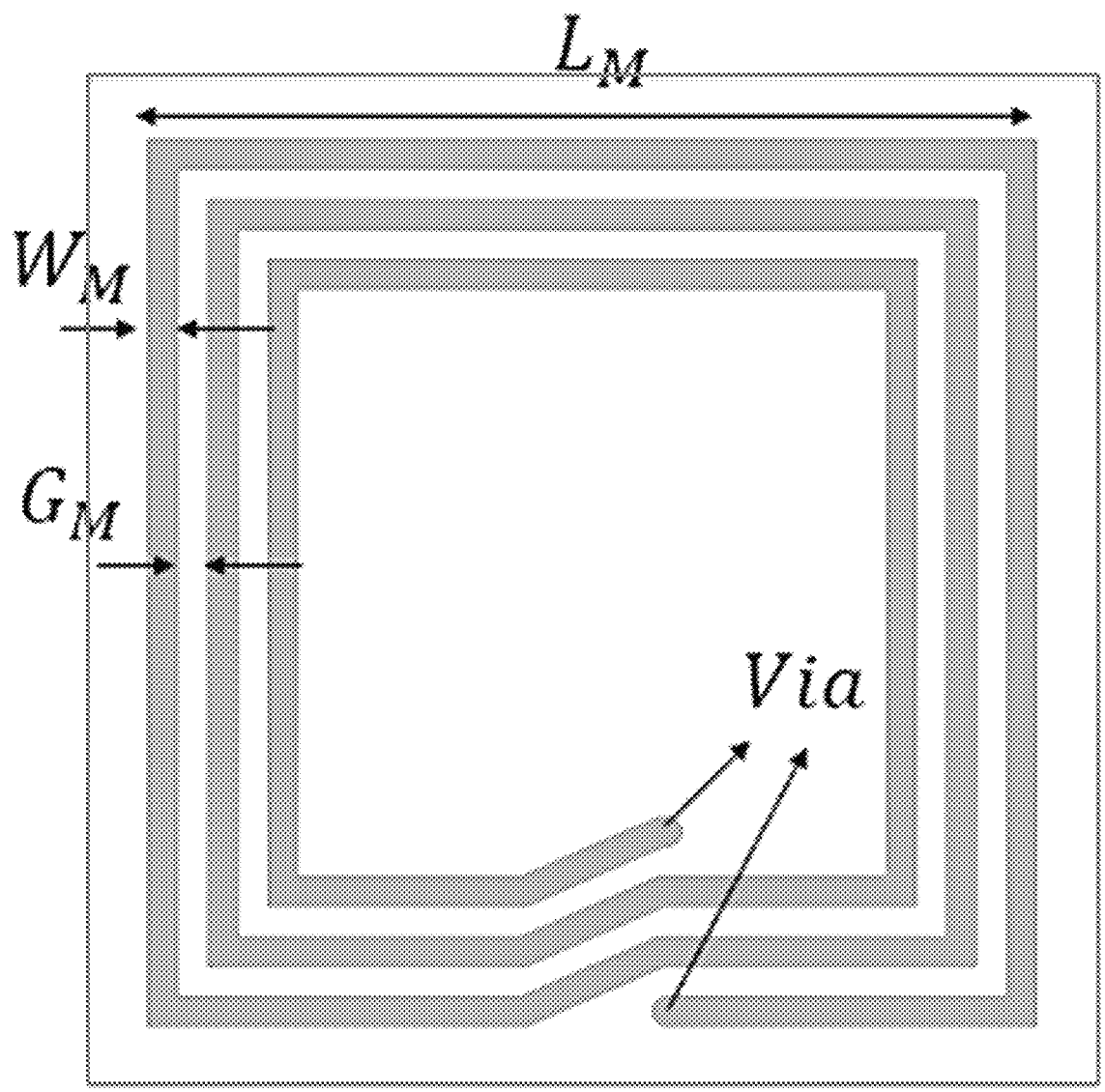
FIGS. 2B-2E show various views (top view, bottom view, perspective view, and cross section view) of an exemplary metamaterial unit cell as utilized in various embodiments of the present disclosure.
Figure 2C:
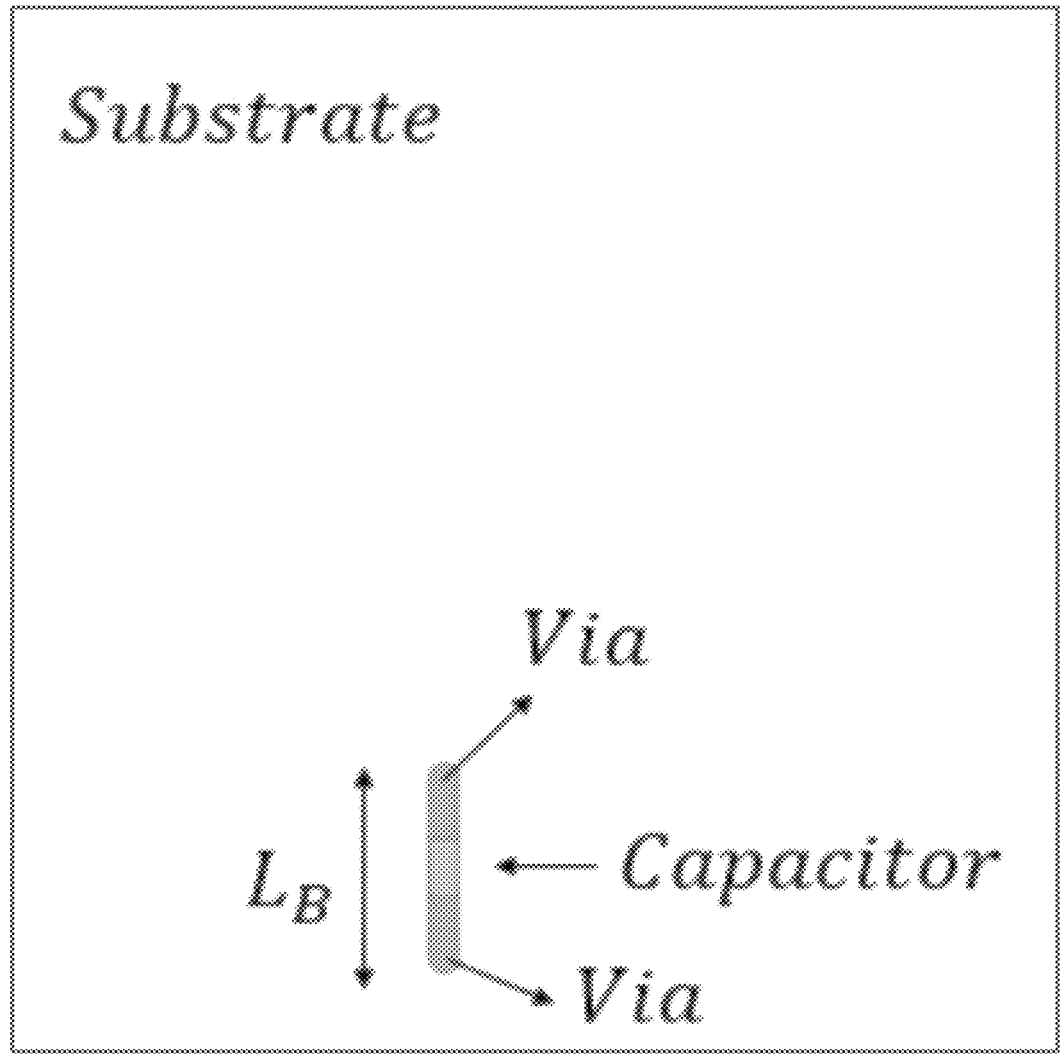
Figure 2D:
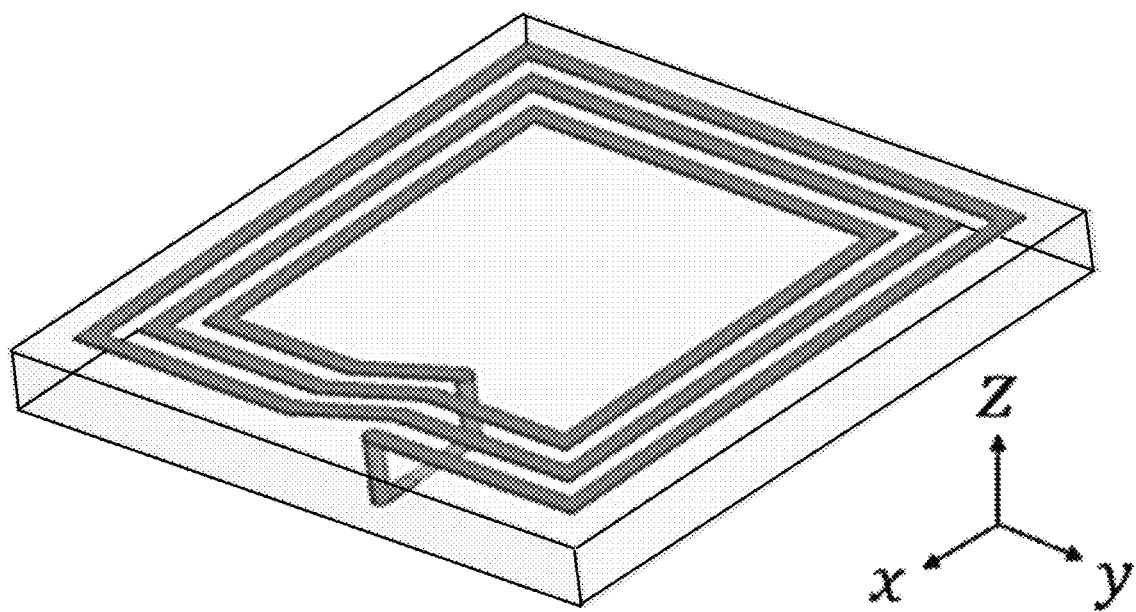
Figure 2E:
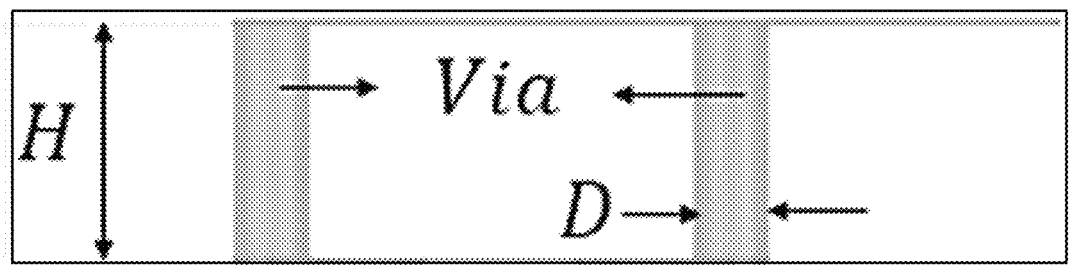

FIG. 2A shows an equivalent circuit of an exemplary metamaterial unit cell in accordance with embodiments of the present disclosure. In the circuit, a capacitor ($C_{cap}$) which has a comparably higher capacitance value than self-capacitance ($C_{gap}$, $C_B$) is connected to the unit cell in order to realize the dual-function capability. Then, a capacitive reactance of the circuit can be calculated using the following equation:

$$\frac{1}{X_c} = \frac{1}{X_{C_{gap}}} + \frac{1}{X_{C_B}} + \frac{1}{X_{C_{cap}}} \quad (1)$$

where $X_C$ is the capacitive reactance of the circuit. When the working frequency is comparably high, such as 2.4 GHz, the capacitive reactance of the connected capacitor $C_{cap}$ becomes almost zero. The reason is that the capacitive reactance of the connected capacitor $C_{cap}$, which is $$X_{C_{cap}} = \frac{1}{2\pi f C_{cap}},$$

goes to zero since both f and $C_{cap}$ terms are very high. Accordingly, in the high frequency range, the resonant frequency of the circuit is not affected by the connected capacitor $C_{cap}$ and is determined by the dimension of the unit cell. Meanwhile, when it comes to the low frequency range, $X_C$ becomes sensitive to the value of the $C_{cap}$ owing to the low value of the working frequency f. Therefore, the connected capacitor $C_{cap}$ can be used to tune the resonant frequency of the circuit. This property of the capacitive reactance in a different frequency range makes the design of the metamaterial straightforward. Once the dimension of the metamaterial unit cell for the target communication frequency is determined, the resonant frequency of the unit cell for WPT can be utilized to determine the value of the connected capacitor $C_{cap}$. By using this property, the metamaterial unit cell is ultimately designed to have dual-function operations for 6.78 MHz and 2.4 GHz.

In accordance with embodiments of the present disclosure, an exemplary metamaterial unit cell is designed to have a negative and zero refractive index for high efficiency WPT and high gain antenna at two different frequencies. In one embodiment, the unit cell is designed on a Rogers tmm4 substrate with a dielectric constant of 4.54, a loss tangent of 0.002, and a thickness of 1.52 mm. In an exemplary embodiment, a three-turns square spiral shaped resonator is utilized for a unit cell and the capacitor is connected to the back side of the unit cell. The configuration of such a metamaterial unit cell is shown in FIGS. 2B-2E, in which the top view, bottom view, perspective view, and cross section view of the designed unit cell are shown in FIGS. 2B, 2C, 2D, and 2E, respectively, and the geometrical parameters in the figure are: $L_M$=14.8 mm, $G_M$=0.5 mm, $W_M$=0.5 mm, $L_B$=3.5 mm, H=1.52 mm, D=1 mm. The value of the connected capacitor, $C_{cap}$, is 3300 pF.

For evaluation purposes, a High Frequency Structure Simulator (HFSS, Ansys Inc.) is utilized to simulate a full 3D structure of the exemplary metamaterial unit cell of FIGS. 2A-2E. The effective refractive index can be obtained from the simulation results by using standard retrieval methods. The methods of calculating the refractive index in two different frequency bands are differing. In general, both effective permittivity ε and permeability μ are required to achieve an effective refractive index of the metamaterial. However, in a deep subwavelength limit which includes the 6.78 MHz WPT case, the magnetic field and electric field decouple, and only the effective permeability is needed to achieve a negative refractive index. Meanwhile, in the case of antenna applications in 2.4 GHz, the device size is not much smaller than the working wavelength, which does not fall in the deep subwavelength limit. Therefore, both effective permittivity and permeability are required to achieve an effective refractive index of the metamaterial. Moreover, the effective refractive index cannot be a negative value, since it is the value of the square root of the product of the two parameters so that a near zero refractive index can be achieved to improve the antenna gain.

Figure 3A:
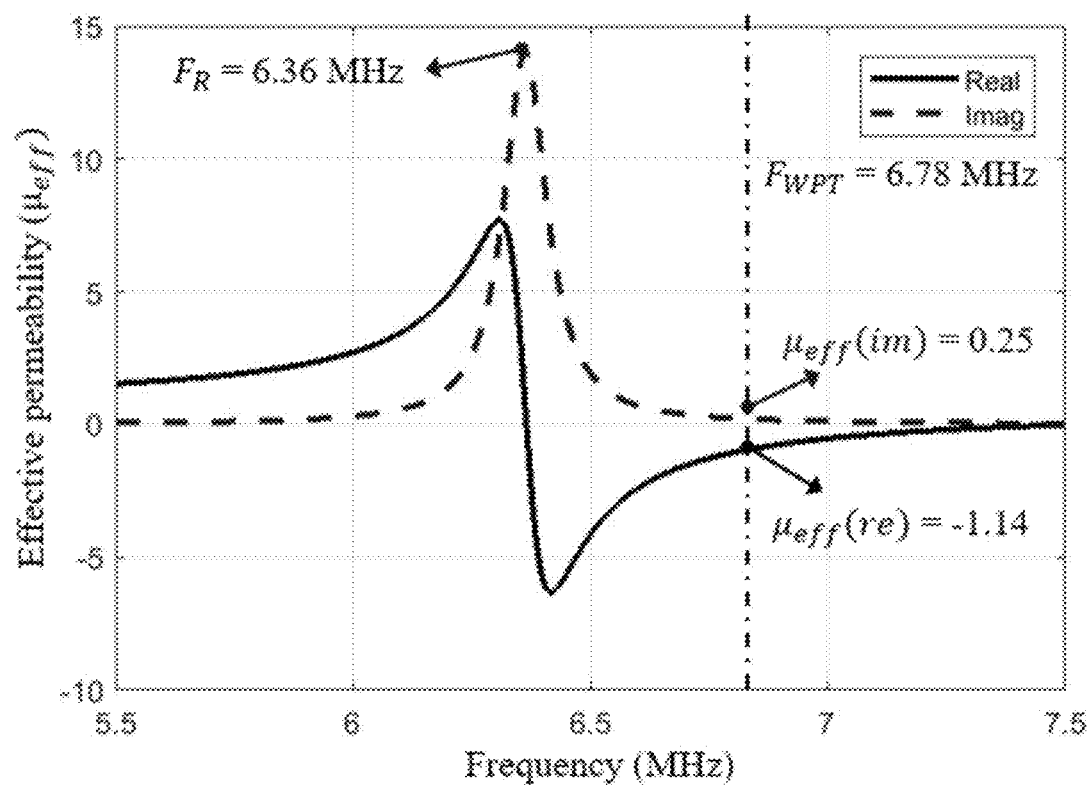
FIG. 3A shows simulation effective permeability results of an exemplary metamaterial unit cell for 6.78 MHz wireless power transfer (WPT) in accordance with various embodiments of the present disclosure.
Figure 3B:
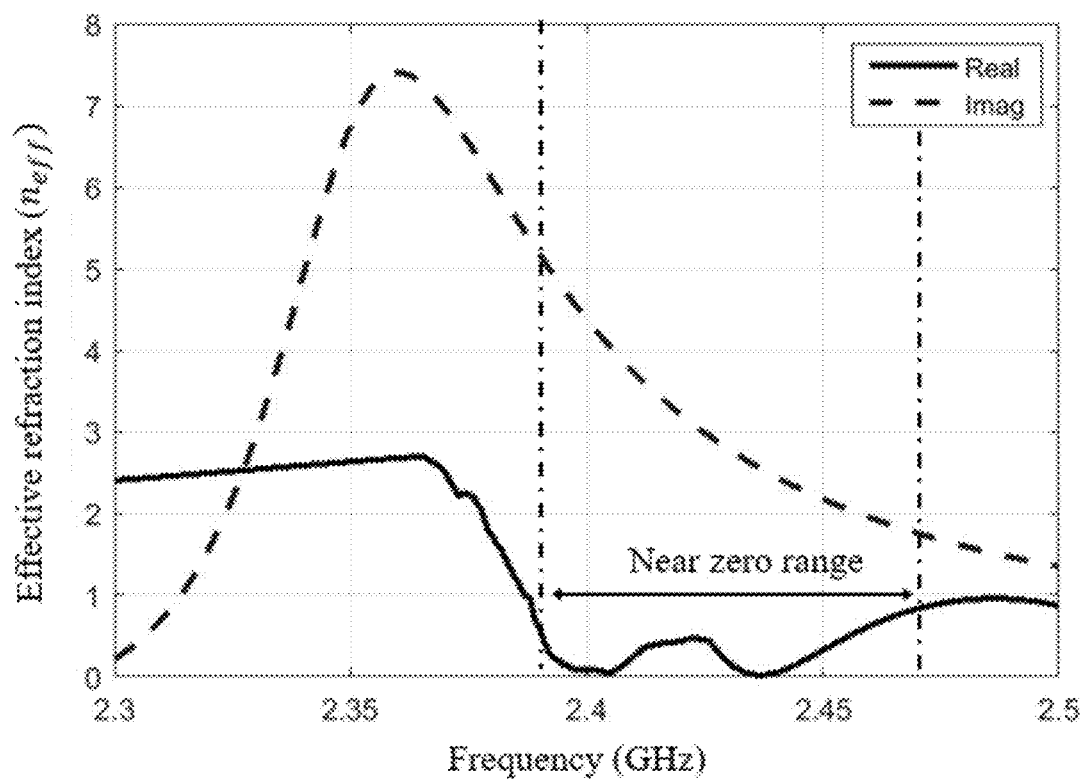
FIG. 3B shows simulation effective refraction index results of an exemplary metamaterial unit cell for a 2.4 GHz antenna in accordance with various embodiments of the present disclosure.

In accordance with various embodiments of the present disclosure, the effective refraction index values are carefully designed for both 6.78 MHz WPT and a 2.4 GHz antenna. As for the WPT applications, the resonant frequency of the metamaterial unit cell is 6.36 MHz and its real value of the effective permeability is −1.15 at 6.78 MHz which means the metamaterial unit cell has a negative effective refraction index value of −1.15. The imaginary value of the effective permeability is 0.25, which means the metamaterial unit cell has relatively low magnetic loss. Therefore, the metamaterial unit cell has a capability to focus the magnetic field so that it improves the transfer efficiency of WPT at 6.78 MHz. As for the antenna applications, the real value of the effective refractive index is designed to have near zero values in the range of 2.38~2.47 GHz, which means the metamaterial can change the direction of electromagnetic field by the boundary conditions to near zero, thereby enhancing the antenna gain in the near zero range. The detailed simulation results of the metamaterial unit cell are shown in FIGS. 3A-3B. In particular, FIG. 3A shows simulation effective permeability results of an exemplary metamaterial unit cell for a 6.78 MHz WPT and FIG. 3B shows simulation effective refraction index results of an exemplary metamaterial unit cell for a 2.4 GHz antenna.

Figure 4:
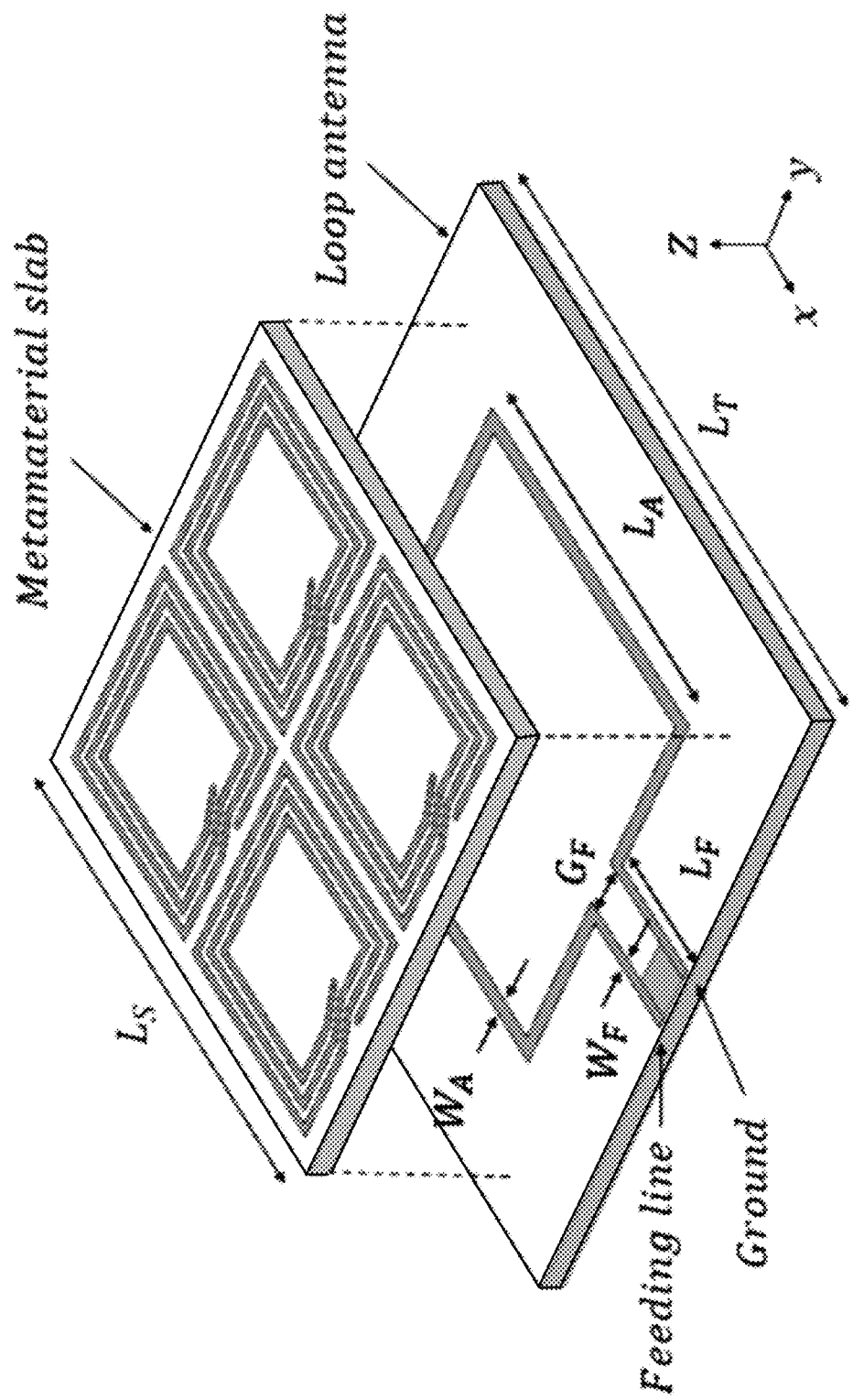
FIG. 4 shows a perspective view of an exemplary metamaterial-inspired dual-function loop antenna in accordance with various embodiments of the present disclosure.

As shown in FIG. 4, in one embodiment, an exemplary metamaterial slab is formed of 2×2 metamaterial unit cells and is integrated on top of a single-turn loop antenna to inspire the dual-function loop antenna. The single loop antenna is designed to operate at 2.4 GHz band and serve as an inductive coil for the WPT system. Accordingly, when the metamaterial slab is placed on top of the loop antenna, the metamaterial slab focuses the magnetic field as well as a receiver coil of the magnetic resonance coupling WPT at 6.78 MHz. In addition, the metamaterial slab serves as the metamaterial lens for antenna gain improvement at 2.4 GHz. The geometrical parameters in the figure are $L_S$=33.6 mm, $L_A$=25.8 mm, $L_F$=8.5 mm, $L_T$=43.6 mm, $W_A$=1 mm, $W_F$=0.7 mm, $G_F$=3 mm.

An exemplary metamaterial slab is fabricated in accordance with an embodiment of the present disclosure using a Rogers tmm4 substrate to fabricate the metamaterial slab and the resulting dual-function loop antenna of a receiver (Rx) component. For an exemplary fabricated single-turn loop antenna and the fabricated metamaterial-inspired dual-function loop antenna, the metamaterial slab is integrated on top of the loop antenna. In order to have a dual-functionality, a 3300 pF capacitor (GRM2165C1H332FA01D, Murata electronics) is connected to each unit cell of the metamaterial slab in parallel.

To demonstrate the transfer efficiency of the dual-function loop antenna, a source coil and a transmitter (Tx) which are the part of a basic 4-coil WPT system are fabricated. In various embodiments, various devices are fabricated using a milling machine, where the Tx coil has four-turns, a turn-to-turn pitch of 10 mm, and an outer diameter of 150 mm, and the source coil has a single turn with a diameter of 150 mm. All the coils are fabricated using a 2.588 mm diameter copper wire. The capacitors are connected to the exemplary loop antenna 10 of the Rx in order to realize the magnetic resonance coupling WPT system at 6.78 MHz.

To obtain simulated and measured results of the WPT function, the power transfer efficiency (PTE) of an exemplary metamaterial-inspired dual-function loop antenna is simulated, measured, and characterized. For the measurement, a vector network analyzer (HP E8361A, Agilent, Inc.) is utilized. The source coil and single-turn loop antenna (load coil) are connected to the two ports of the vector network analyzer. The magnitude of the S-parameter (S21) value is extracted using the vector network analyzer. For the WPT system, the PTE can be explained as the ratio of the received power at the load coil (port 2) to the inserted power at the source coil (port 1), so the PTE can be directly calculated using the following equation:

$$\text{PTE}(\eta)=|S_{21}|^2\times 100\% \quad (2)$$

Figure 5A:
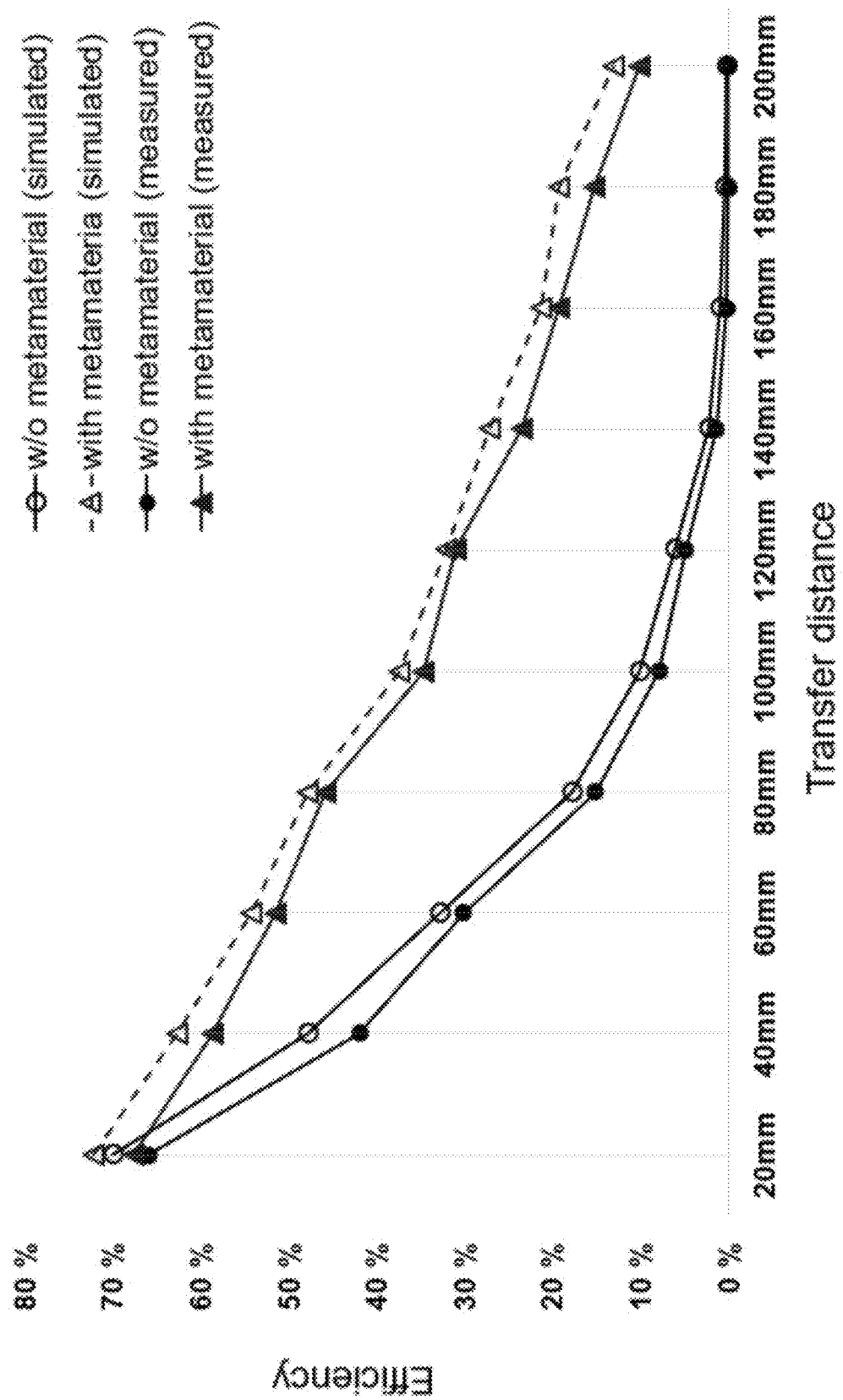
FIG. 5A shows simulated and measured power transfer efficiency results of an exemplary WPT system with and without a metamaterial slab in accordance with various embodiments of the present disclosure.

The transfer distance between Tx and Rx coils is from 20 mm to 200 mm. As shown in FIG. 5A, the measured results show a similar tendency compared with simulated results. The WPT with the metamaterial slab which is integrated to a single-turn loop antenna shows improved PTE for the entire distances. Since the single-turn loop antenna serves as the inductive coil without the metamaterial slab, the PTE of the WPT system significantly decreases as the transfer distance increases which shows the limitation of the inductive coupling WPT. However, when the metamaterial slab is integrated on the loop antenna, the decreasing slope of the PTE becomes approximately linear which means the metamaterial slab can serve as the magnetic coupled Rx and also help focus magnetic field lines effectively. At the distance of 100 mm, the PTE improves from 8.8% to 36.87% after the metamaterial slab is integrated on the loop antenna and shows a factor of 4.19 improvements. At the distance of 200 mm, the PTE improves from 0.08% to 10.28% after the metamaterial slab is integrated and shows a factor of 128.5 improvements. In addition, when we compare the PTE at the transfer distance of 60 mm without the metamaterial slab with the PTE at the transfer distance of 120 mm with the metamaterial slab, the measured PTEs for both cases are the same which are about 31%. The measurement results show that by integrating the slab, the transfer distance of the WPT can be increased substantially. Further, the measurement results show that the exemplary metamaterial slab serves as the Rx as well as the metamaterial lens and is highly effective for improving the PTE and the transfer distance of the WPT system.

Table I (FIG. 5B) compares an exemplary WPT system (referred to as "This work" in the table) incorporated with a metamaterial-inspired dual-function loop antenna with the PTE performance of a previously reported metamaterial based WPT work. Owing to the different coil sizes, the transfer distance between Tx and Rx is normalized to the radius of the Tx coil. Normalized transfer distance can be calculated using the following equation:

$$\text{Normalized transfer distance} = \frac{\text{Transfer distance}}{\text{Radius of the } Tx} \quad (3)$$

Even though it is hard to compare the PTE results directly because of different conditions, such as an operating frequency, configuration of the metamaterial, number of slab inserted, etc., the comparison results show that the WPT system with an exemplary dual-function loop antenna has a relatively good WPT performance.

Figure 6A:
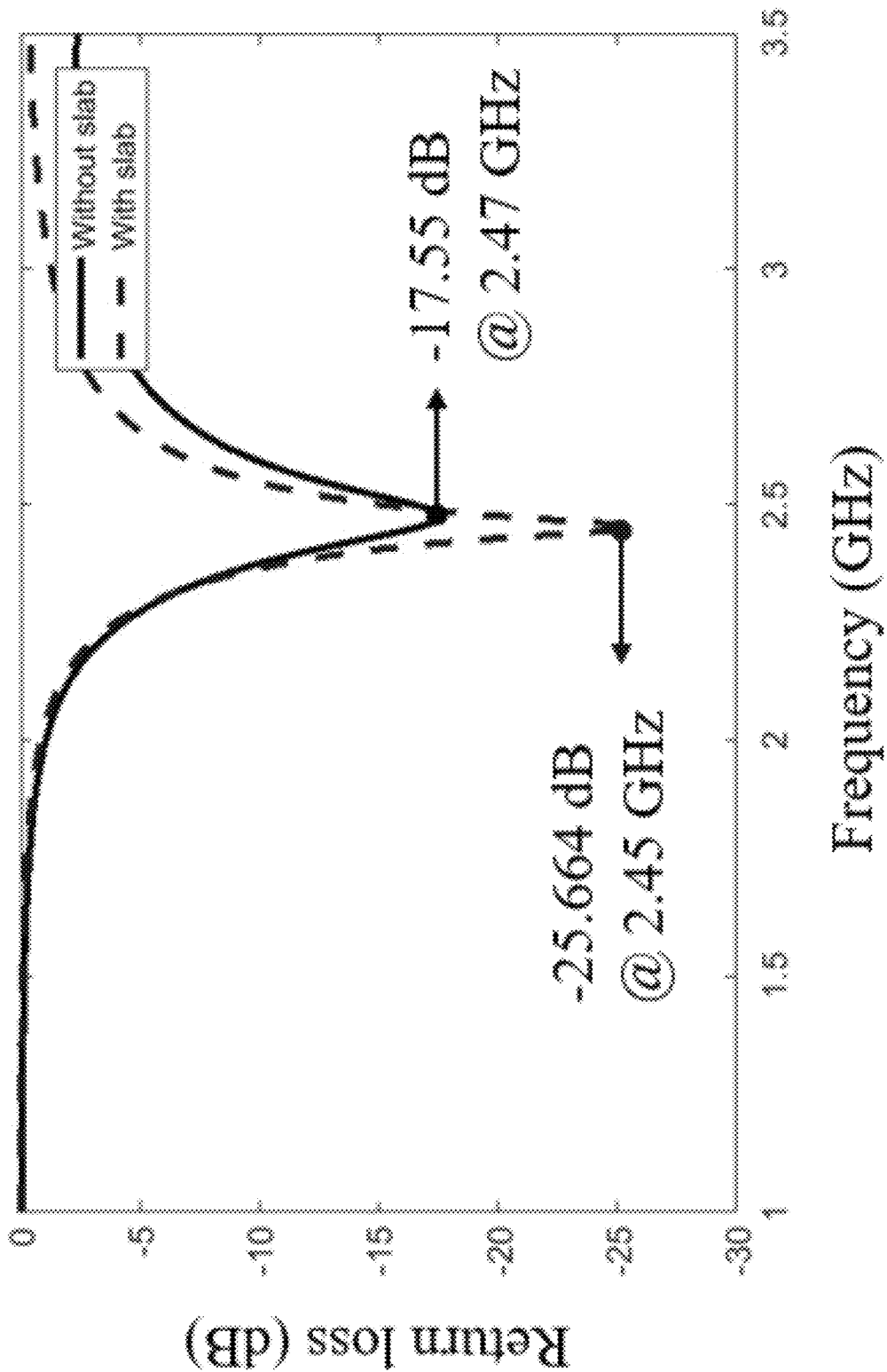
FIGS. 6A-6B show simulated results and measured results from a comparison of the return loss results of a single-turn loop antenna without a metamaterial slab and with a metamaterial slab in accordance with embodiments of the present disclosure.
Figure 6B:
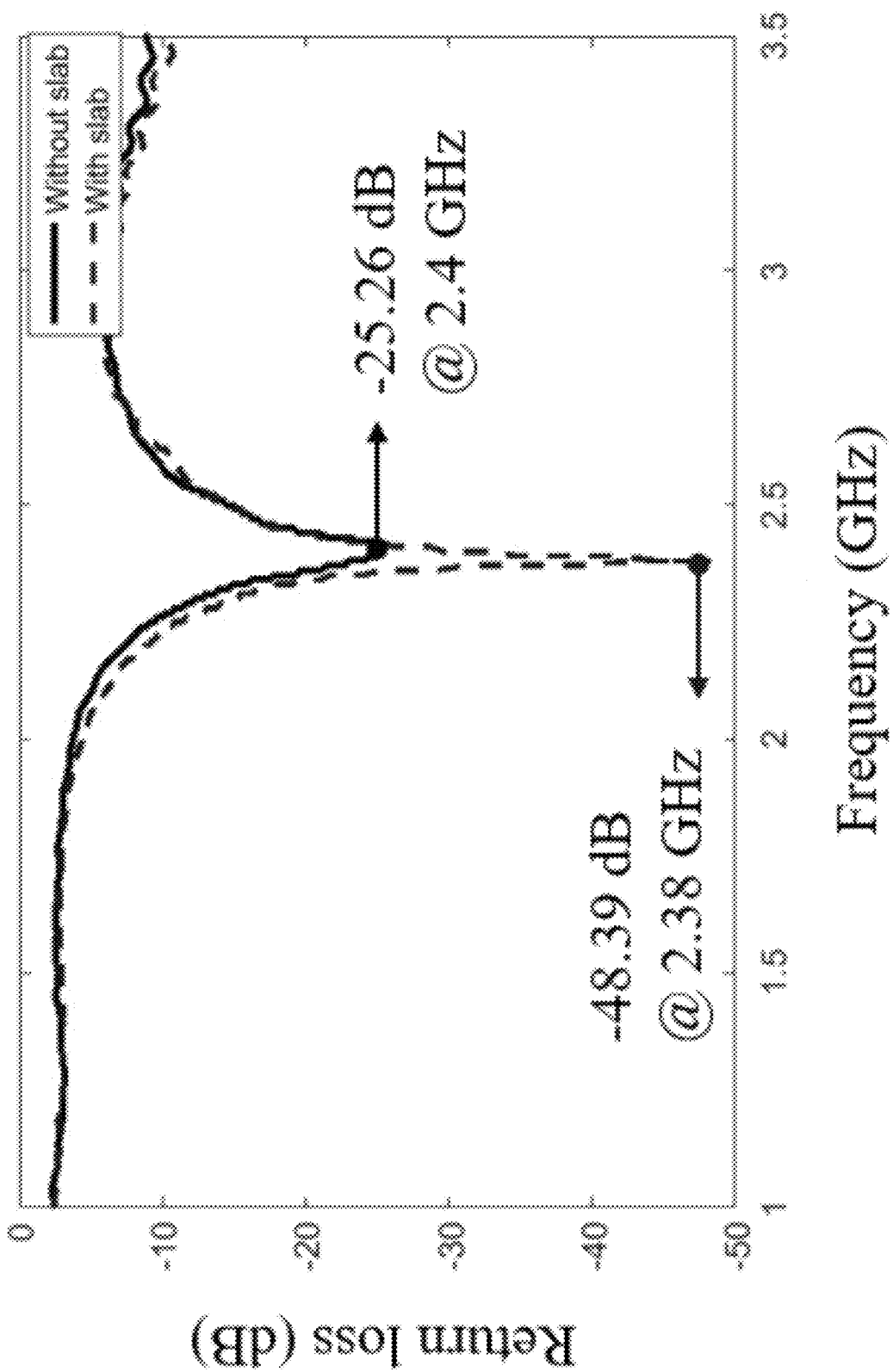

To obtain measured and simulated results of the antenna function, the measurement of the return loss of the single-turn loop antenna without and with a metamaterial slab was carried out using a vector network analyzer (HP E8361A, Agilent, Inc.) after standard one port short-open-load (SOL) calibration between 1 GHz and 3.5 GHz. The simulated and measured return losses of the single-turn loop antenna without the metamaterial slab and with the metamaterial slab are shown in FIGS. 6A and 6B respectively. Here, the measured results of the single-turn loop antenna without and with the metamaterial slab show a return loss of 25.26 dB at 2.4 GHz and 48.39 dB at 2.38 GHz, which matches well with the simulated results. In addition, the simulated performances of the single-turn loop antenna without and with a metamaterial slab are summarized in Table II (below). It should be noted that the peak gain of the loop antenna improves by 1.89 dB when the metamaterial slab is integrated.

TABLE II

| Parameters | Without Metamaterial Slab | With Metamaterial Slab |
| --- | --- | --- |
| Efficiency | 98.1% | 95.9% |
| Peak Gain | 3.26 dB | 5.15 dB |

Figure 7:
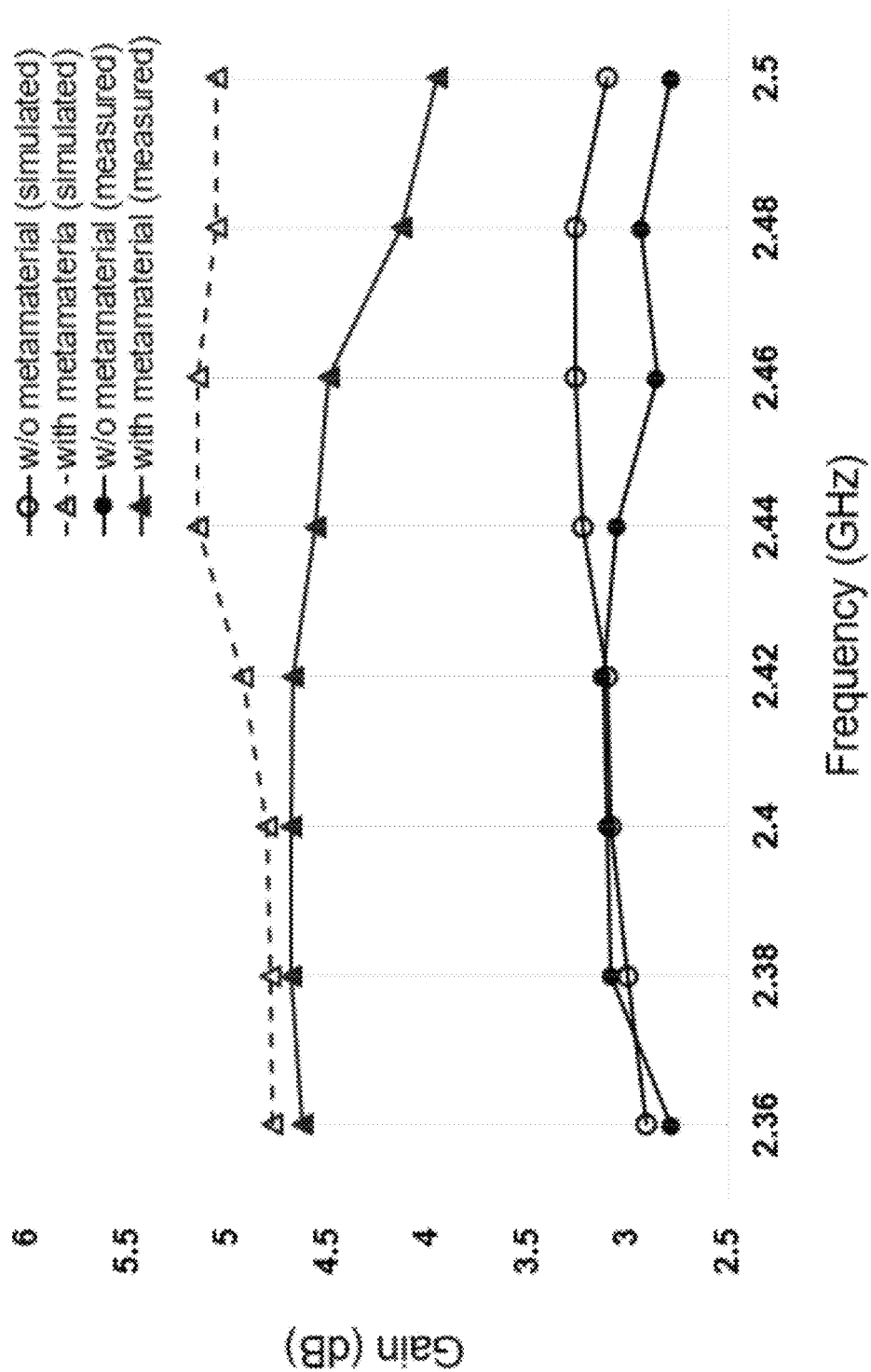
FIG. 7 shows simulated and measured peak gains of a single-loop antenna without and with a metamaterial slab in accordance with embodiments of the present disclosure.
Figure 8A:
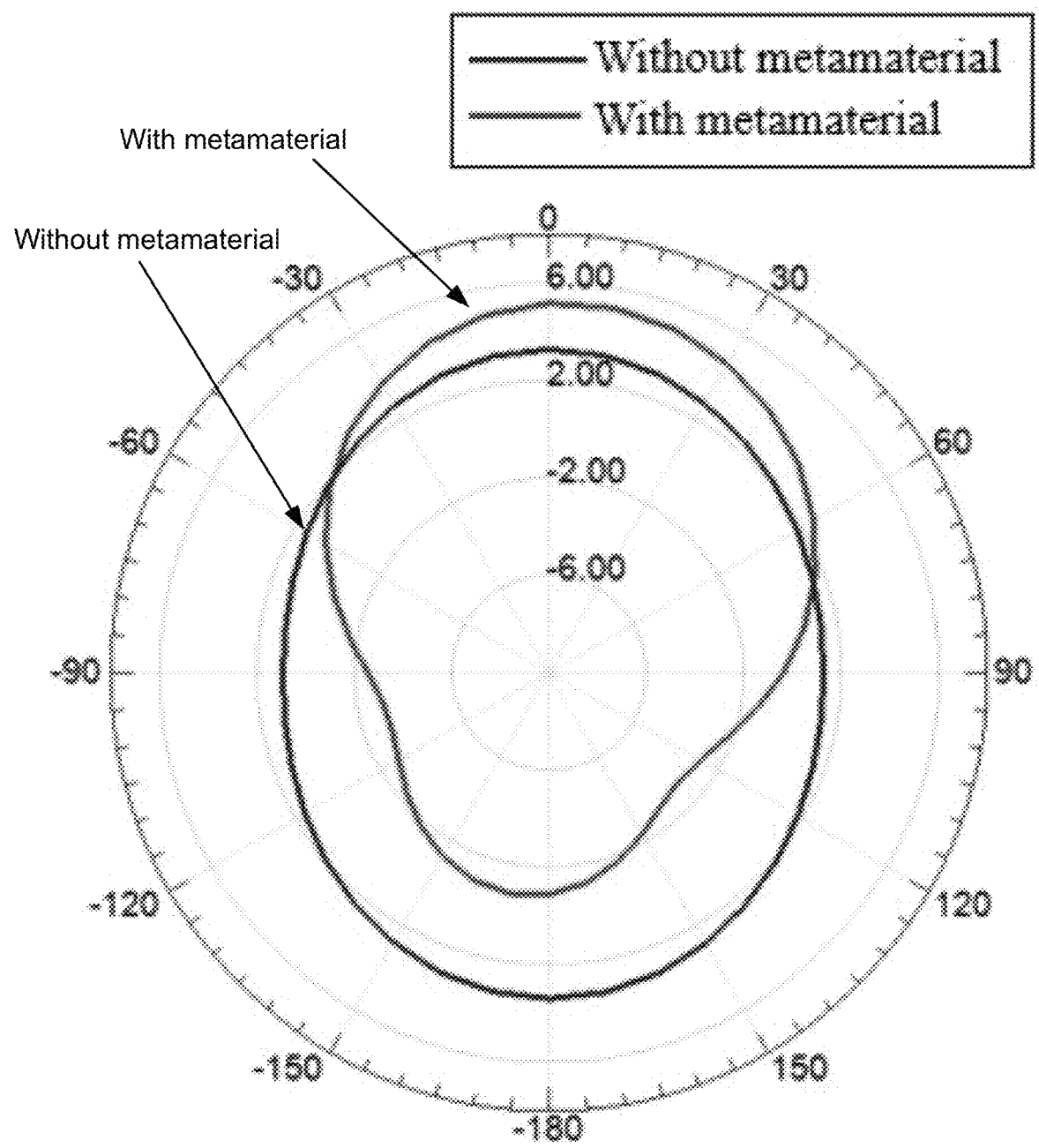
FIGS. 8A-8B show simulated radiation patterns of a single-loop antenna without and with a metamaterial slab in the XZ plane and the YZ plane, respectively, in accordance with embodiments of the present disclosure.
Figure 8B:
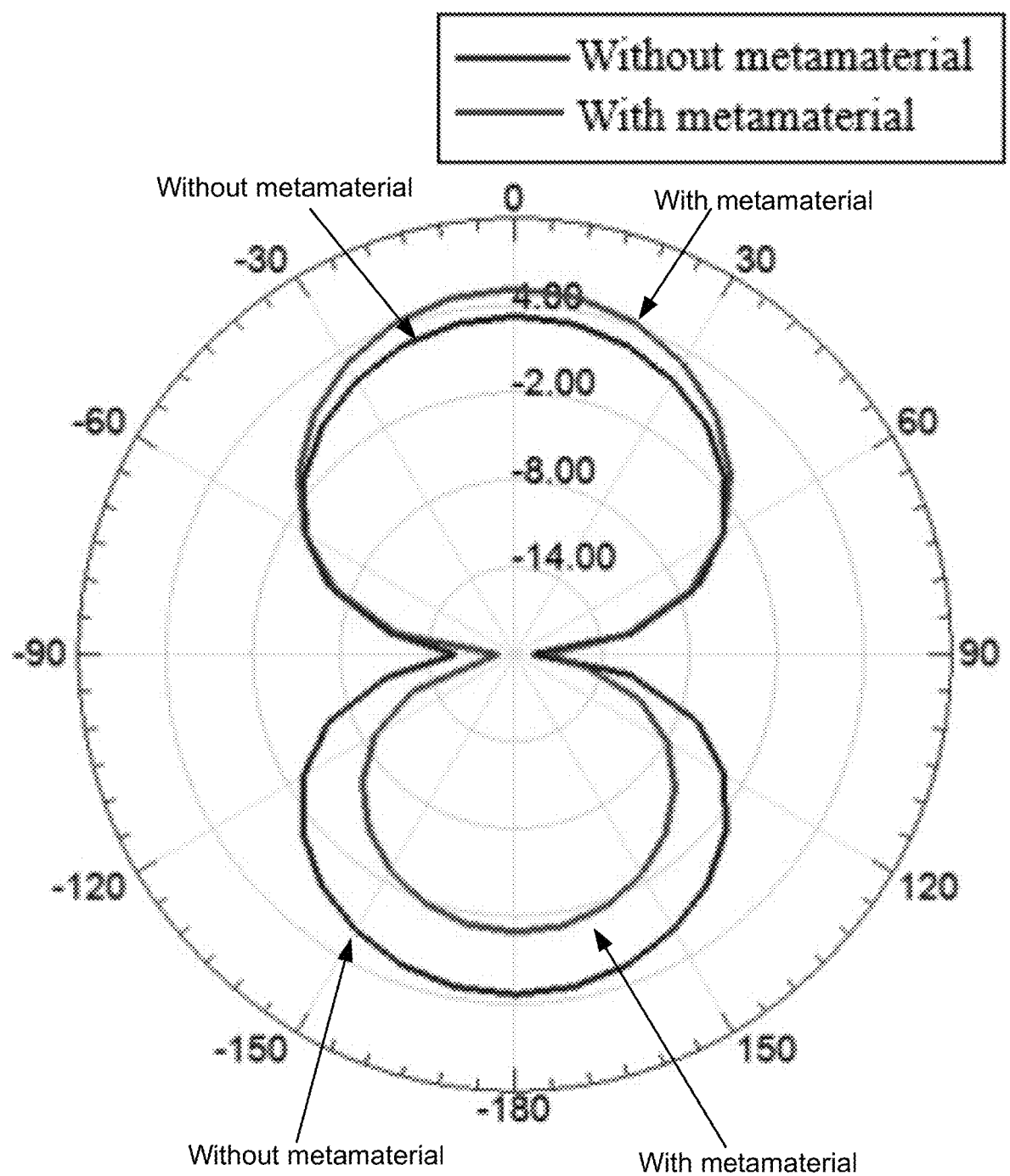

FIG. 7 shows the simulated and measured peak gain of the single-loop antenna without and with the metamaterial slab. The measured gains of the antenna with and without the metamaterial slab at the resonant frequency, 2.4 GHz and 2.38 GHz, are 3.10 dB and 4.68 dB, respectively, which proves that the gain of the loop antenna is improved by 1.89 dB when the metamaterial slab is integrated on top of the loop antenna. Next, FIGS. 8A-8B show the simulated radiation patterns of the loop antenna without and with the metamaterial slab in the XZ plane and the YZ plane respectively.

In accordance with the present disclosure, a metamaterial slab of an exemplary dual-function loop antenna has a dual-band property for 6.78 MHz WPT and 2.4 GHz wireless communications, enhancing the performance of WPT and antenna functions. The PTE of the WPT system and gain of the antenna can be effectively enhanced owing to the metamaterial's property of wave focusing. As for the WPT measurement results, the PTE of the WPT system with an exemplary metamaterial slab is increased from 8.8% to 36.87% at 100 mm and 0.08% to 10.28% at 200 mm. As for the antenna measurement results, the peak gain of the loop antenna improves by 1.89 dB when the metamaterial slab is integrated. In addition, an exemplary metamaterial-inspired dual-function loop antenna shows a size reduction of 50% compared to a device consisting of a WPT coil and a wireless communication antenna. Such a metamaterial-inspired dual-function loop antenna brings new possibilities for wireless charging and communication devices with increased portability.

As used herein, "approximately," "substantially," and the like, when used in connection with a numerical variable, can generally refers to the value of the variable and to all values of the variable that are within the experimental error (e.g., within the 95% confidence interval for the mean) or within +/−10% of the indicated value, whichever is greater. As used herein, the terms "about," "approximate," "at or about," and "substantially" can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

It should be emphasized that the above-described embodiments are merely possible examples of implementations, merely set forth for a clear understanding of the principles of the present disclosure. Many variations and modifications may be made to the above-described embodiment(s) without departing substantially from the principles of the present disclosure. All such modifications and variations are intended to be included herein within the scope of this disclosure.

The invention claimed is:

1. An antenna device comprising:
a loop antenna; and
a metamaterial slab integrated on top of the loop antenna, wherein the metamaterial slab metamaterial has a negative refractive index value at a first frequency and a near zero refractive index at a second frequency, the first frequency is less than the second frequency, each unit cell of the metamaterial slab is coupled to a capacitor in parallel, and the first frequency is attributed to a capacitance value of the capacitor and the second frequency is attributed to a dimension of the unit cell, and
wherein the antenna device is configured to receive wireless power transfer signals over the first frequency and wireless communication signals over the second frequency.

2. The antenna device of claim 1, wherein the first frequency is approximately 6.78 MHz and the second frequency is approximately 2.4 GHz.

3. The antenna device of claim 2, wherein the negative refraction index value of the metamaterial slab is approximately −1.15 at approximately 6.78 MHz.

4. The antenna device of claim 2, wherein the metamaterial slab has a near zero refractive index value across a frequency range of 2.38 GHz to 2.47 GHz.

5. The antenna device of claim 1, wherein the metamaterial slab comprises a 2×2 array of metamaterial unit cells.

6. The antenna device of claim 5, wherein the metamaterial slab has a dimension of 33.6 mm×33.6 mm.

7. The antenna device of claim 1, wherein the loop antenna comprises a single-turn loop antenna.

8. The antenna device of claim 1, wherein each of the unit cells comprises a three-turns square spiral shaped resonator.

9. The antenna device of claim 1, wherein the loop antenna comprises a feeding line, the antenna device further comprising a wireless power transfer (WPT) path coupled to the feeding line and an antenna RF path coupled to the feeding line, the WPT path comprising an RF-DC conversion component and a power storage component connected in series, the antenna RF path comprising a band pass filter, a low noise amplifier, and an RF transceiver connected in series.

10. The antenna device of claim 1, wherein the capacitor comprises a 3300 pF capacitor.

11. A method of fabricating an antenna device comprising:
providing a loop antenna;
integrating a metamaterial slab on top of the loop antenna, wherein the metamaterial slab metamaterial has a negative refractive index value at a first frequency and a near zero refractive index at a second frequency, the first frequency is less than the second frequency, each unit cell of the metamaterial slab is coupled to a capacitor in parallel, the first frequency is attributed to a capacitance value of the capacitor, and the second frequency is attributed to a dimension of the unit cell; and configuring the antenna device to receive wireless power transfer signals over the first frequency and wireless communication signals over the second frequency.

12. The method of claim 11, wherein the first frequency is approximately 6.78 MHz and the second frequency is approximately 2.4 GHz.

13. The method of claim 12, wherein the negative refraction index value of the metamaterial slab is approximately −1.15 at approximately 6.78 MHz.

14. The method of claim 12, wherein the metamaterial slab has a near zero refractive index value across a frequency range of 2.38 GHz to 2.47 GHz.

15. The method of claim 11, wherein the metamaterial slab comprises a 2×2 array of metamaterial unit cells.

16. The method of claim 15, wherein the metamaterial slab has a dimension of 33.6 mm×33.6 mm.

17. The method of claim 11, wherein the loop antenna comprises a single-turn loop antenna.

18. The method of claim 11, wherein each of the unit cells comprises a three-turns square spiral shaped resonator.

19. The method of claim 11, wherein the loop antenna comprises a feeding line, the antenna device further comprising a wireless power transfer (WPT) path coupled to the feeding line and an antenna RF path coupled to the feeding line, the WPT path comprising an RF-DC conversion component and a power storage component connected in series, the antenna RF path comprising a band pass filter, a low noise amplifier, and an RF transceiver connected in series.

20. The method of claim 11, wherein the capacitor comprises a 3300 pF capacitor.

* * * * *